United States Patent Office 2,917,431
Patented Dec. 15, 1959

2,917,431
AQUEOUS INORGANIC SALT-SULFOSUCCINATE SOLUTIONS

George Di Cicco, Highland Park, N.J., assignor to American Cyanamid Company, New York, N.Y., a corporation of Maine No Drawing. Application August 1, 1957
Serial No. 675,579

2 Claims. (Cl. 167—56)

This invention relates to aqueous solutions of inorganic salts having water-soluble sulfosuccinates dissolved therein by the solubilizing action of diethylacetamide.

It is a well known fact that the water-soluble salts of dialkylsulfosuccinic acid are not permanently soluble in aqueous electrolyte solutions when the concentration of electrolyte is more than a few percent, but are salted out and appear as oil droplets on the surface of the salt solution. This has seriously limited the usefulness of the sulfosuccinate wetting agents in a number of fields where such concentrated salt solutions are used. It is a principal object of the present invention to overcome this difficulty by providing a solubilizing agent for sulfosuccinate wetting agents, and particularly for water-soluble dioctyl sulfosuccinate salts, which will permit the preparation and use of concentrated aqueous salt solutions containing them.

My invention is based on the discovery that N,N-diethylacetamide is an effective solubilizing agent for the water-soluble sulfosuccinate salts, i.e., the alkali metal, ammonium, ethanolamine and similar salts of the dialkyl esters of sulfosuccinic acid, and that its presence will enable the preparation of relatively concentrated aqueous salt solutions containing sufficient quantities of these surface-active agents to impart useful wetting and detergent properties thereto.

The sulfosuccinates that are most widely used commercially as wetting agents are the dioctyl esters of sulfosuccinic acid in the form of their alkali metal and most usually their sodium salts. Sodium di-(2-ethylhexyl) sulfosuccinate is sold as "Aerosol OT." The solubility limits of this wetting agent in water and in representative aqueous salt solutions at 25° C. are as follows:

| Weight per 100 ml. Water | Percent Concn. of Electrolyte Soln. in which 1% is soluble at 25° C. | | | | |
|---|---|---|---|---|---|
| | NaCl | NH₄Cl | (NH₄)₂HPO₄ | NaNO₂ | Na₂SO₄ |
| Clear solution | 1.5 | 0.5 | 0.5 | ¹2 | 0.5 | 1 |
| Turbid solution | | 3 | 2 | 3 | 1 | 3 |

¹ Slightly turbid.

The sodium salts of bis-esters of sulfosuccinic acid with other octyl alcohols, notably normal octyl alcohol (octanol-1) and the highly branched-chain primary octyl alcohol obtained from hydrocarbon polymers by the "Oxo" process are also available commercially, and have about the same solubility characteristics as "Aerosol OT"; they are therefore included within the designation "dioctyl sulfosuccinates."

It is evident from the tabulation given above that aqueous solutions containing more than about 1–2% of dissolved inorganic salts will not retain water soluble dioctyl sulfosuccinates dissolved therein. As the concentration of dissolved salt in the solution is increased the solubility of the sulfosuccinate is correspondingly reduced, so that the sulfosuccinate separates out on standing. I have found that the addition of diethylacetamide to such salt solutions will prevent the separation of water-soluble sulfosuccinates therefrom and will cause them to remain in solution. The quantity of diethylacetamide to be used, which is hereinafter sometimes designated as the solubilizing quantity, depends primarily on the concentration of inorganic salt in the solution and the amount of the wetting agent to be dissolved, but is usually within the range of about 3–20% when salt solutions containing from 0.01% to about 0.2% of sulfosuccinate are desired. These quantities of dioctyl sulfosuccinate are usually sufficient to impart the desired wetting and detergent properties to the salt solutions.

Although the action of diethylacetamide in solubilizing the water-soluble dialkyl sulfosuccinate salts in aqueous salt solutions such as the sodium and ammonium salts listed above appears to be general in character, it is particularly important in solubilizing the alkali metal, ammonium and ethanolamine dioctyl sulfosuccinates, since these possess only a very low degree of solubility in aqueous salt solutions. The invention will therefore be further described and illustrated with reference to the solubilization of "Aerosol OT" in relatively neutral alkali metal phosphate solutions which are sold commercially as enemas. Solutions of this type are usually made up by dissolving suitable proportions of monosodium dihydrogen phosphate and disodium monohydrogen phosphate in water to obtain a pH within the range of about 5–7 and a dissolved salt concentration of about 10–25%. The presence of detergent quantities of a water-soluble dioctyl sulfosuccinate such as "Aerosol OT" in such enemas, within the range of about 0.02–0.1%, is of great assistance in the treatment of severe fecal impactions and even in treating lesser degrees of constipation (Fitzpatrick et al., J.A.M.A., vol. 158 (1955), page 261). It has been found that the addition of diethylacetamide in quantities of about 5–20% to such phosphate solutions will permit the dissolution of the indicated quantities of the sulfosuccinate therein.

The solubilizing action of diethylacetamide, and also the fact that other related organic materials have no solvent action in strong inorganic salt solutions, is shown by the following experimental results. A double strength enema composition, intended for dilution with an equal volume of water before use and having a pH of 5.35, was made by dissolving 16 grams of sodium dihydrogen phosphate (NaH₂PO₄.H₂O) and 6 grams of disodium monohydrogen phosphate (Na₂HPO₄.7H₂O) in distilled water to a volume of 50 ml. In the table below this is identified as "Phosphate Solution."

Mixtures of this solution with an aqueous 1% solution of commercial sodium di-(2-ethylhexyl) sulfosuccinate, identified in the table by its trade-name "Aerosol OT," were prepared containing several different materials being tested as solubilizing agents and their appearance when freshly prepared and after two weeks standing at room temperature was noted. The appearance of the solutions and their compositions are shown in the following table in which the quantities are in milliliters.

Table

| | 1 | 2 | 3 | 4 | 5 | 6 | 7 |
|---|---|---|---|---|---|---|---|
| Phosphate solution | 50 | 50 | 50 | 50 | 50 | 50 | 50 |
| Water | 50 | 45 | 35 | 37 | 40 | 35 | 35 |
| "Aerosol OT," 1% soln | | 5 | 5 | 5 | 5 | 5 | 5 |
| Diethylacetamide | | | 10 | 8 | 5 | | |
| Ethylacetamide | | | | | | 10 | |
| Propylene glycol | | | | | | | 10 |
| Appearance: | | | | | | | |
| Fresh | (¹) | (²) | (¹) | (¹) | (²) | (²) | (²) |
| After 2 weeks | A | B | A | A | (²) | B | B |

¹ Clear.
² Cloudy.
A = Clear Solution.
B = Insoluble material floating on surface.

These results show that salting out of the "Aerosol OT" by phosphates can be overcome by adding diethylacetamide to the solution. They also show that this result is not obtained with 10% of monoethylacetamide or of propylene glycol. Other additives tested in a similar manner, but found not to overcome the salting out, are dimethylformamide, urea, 1,1-diethylurea and 1,3-diethylurea.

A series of preparations containing the same quantities of phosphate solution and "Aerosol OT" with from 5 to 22% of dimethylacetamide, with water sufficient to make 100 ml., were also made up and examined. None of these was satisfactory; either the sulfosuccinate was salted out or, at higher concentrations, the solvent itself separated as an upper layer.

It has been found, however, that N,N-methylethylacetamide and water-soluble N,N-dialkylacetamide of higher molecular weight than diethylacetamide are effective solubilizing agents for water-soluble dialkyl sulfosuccinate salts in aqueous inorganic salt solutions. The dialkylacetamides which are sufficiently water-soluble for this purpose are defined by the formula

in which R is an alkyl radical of from 2 to 5 carbon atoms and $R_1$ is an alkyl radical of from 1 to 5 carbon atoms. Typical compounds of this class are N,N-dipropylacetamide, N,N-dibutylacetamide, N,N-diamylacetamide, N,N-methylbutylacetamide, N,N-ethylpropylacetamide and the like. These and other compounds of the same class may be added to aqueous 3–25% solutions of water-soluble inorganic salts, such as the sodium and ammonium salts listed above, in amounts of about 5–20% and will function to maintain from 0.01% to about 0.2% of water-soluble dioctyl sulfosuccinate salts in solution therein.

What I claim is:

1. An aqueous 10–25% solution of a mixture of monosodium dihydrogen phosphate and disodium monohydrogen phosphate having a pH within the range of about 5–7 having dissolved therein about 0.02–0.1% of a water-soluble dioctyl sulfosuccinate salt and, as a solubilizing agent therefor, about 5–20% of diethylacetamide.

2. An aqueous 10–25% solution of a mixture of monosodium dihydrogen phosphate and disodium monohydrogen phosphate having a pH within the range of about 5–7 having dissolved therein about 0.02–0.1% of sodium dioctyl sulfosuccinate and, as a solubilizing agent therefor, about 5–20% of diethylacetamide.

References Cited in the file of this patent
UNITED STATES PATENTS

| | | |
|---|---|---|
| 2,028,091 | Jaeger | Jan. 14, 1936 |
| 2,295,831 | Caryl | Sept. 15, 1942 |
| 2,383,740 | Tucker | Aug. 28, 1945 |
| 2,562,154 | Vitalis | July 24, 1951 |
| 2,562,155 | Vitalis | July 24, 1951 |
| 2,562,156 | Vitalis | July 24, 1951 |
| 2,567,159 | Vitalis | Sept. 4, 1951 |
| 2,671,748 | Crooks | Mar. 9, 1954 |

OTHER REFERENCES

"Aerosol Wetting Agents," pub. by Amer. Cyanamid and Chem. Corp. (1941), pp. 39 and 40.